United States Patent
Tameshige et al.

(10) Patent No.: US 10,503,500 B2
(45) Date of Patent: Dec. 10, 2019

(54) INQUIRY RESPONSE SYSTEM AND INQUIRY RESPONSE METHOD

(71) Applicant: HITACHI, LTD., Tokyo (JP)

(72) Inventors: Takashi Tameshige, Tokyo (JP); Jun Mizuno, Tokyo (JP); Junji Kinoshita, Tokyo (JP); Yuichi Taguchi, Tokyo (JP); Shigeru Tachikawa, Tokyo (JP); Yuji Hirose, Tokyo (JP); Mitsuhiro Nagata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/303,248

(22) PCT Filed: Sep. 1, 2016

(86) PCT No.: PCT/JP2016/075598
§ 371 (c)(1),
(2) Date: Nov. 20, 2018

(87) PCT Pub. No.: WO2018/042584
PCT Pub. Date: Mar. 8, 2018

(65) Prior Publication Data
US 2019/0205129 A1    Jul. 4, 2019

(51) Int. Cl.
*G06F 9/44*     (2018.01)
*G06F 8/77*     (2018.01)
*G06F 9/54*     (2006.01)

(52) U.S. Cl.
CPC ............... *G06F 8/77* (2013.01); *G06F 9/542* (2013.01); *G06F 9/546* (2013.01)

(58) Field of Classification Search
CPC ..... G06F 8/71; G06F 8/20; G06F 8/36; G06F 9/44505; G06Q 10/10
USPC .......................................................... 717/120
See application file for complete search history.

(56) References Cited

U.S. PATENT DOCUMENTS

| 7,865,888 B1* | 1/2011 | Qureshi | G06F 11/079 717/168 |
| 2012/0233600 A1* | 9/2012 | Uno | G06F 11/3636 717/128 |

FOREIGN PATENT DOCUMENTS

JP    2016-024786 A    2/2016

OTHER PUBLICATIONS

International Search Report of PCT/JP2016/075598 dated Nov. 8, 2016.

* cited by examiner

*Primary Examiner* — Chuck O Kendall
(74) *Attorney, Agent, or Firm* — Mattingly & Malur, PC

(57) ABSTRACT

A management system constructs management information indicating that log chunks and issue chunks extracted from a first system managing log information and issue information output by a process related to a first team for a program to be developed are linked. The management system searches, from the management information, a log message group compatible with a designated log message group that is one or more log messages related to the issue by log pattern matching using the designated log message group in a case of receiving an inquiry with which the designated log message group is associated from the second system. The management system displays, on the second system, a response containing a handling method represented by handling method information corresponding to the found log message group.

10 Claims, 11 Drawing Sheets

FIG.5

LOG MANAGEMENT TABLE
221

| EVENT ID | TENANT ID | HASH VALUE | MESSAGE GROUP | MESSAGE CONTENT |
|---|---|---|---|---|
| 1 | 1 | Hash1 | MessageID01, MessageID02, MessageID03 AND Tag01 | ... |
| 2 | 1 | Hash2 | MessageID01 AND MessageID02 OR MessageID03 AND Tag02 | ... |
| 3 | 1 | Hash3 | MessageID01, MessageID02, MessageID03, MessageID04 | ... |
| 4 | 2 | Hash1 | MessageID01, MessageID02, MessageID03 AND Tag01 | ... |
| ... | ... | ... | ... | ... |

FIG.6

ISSUE MANAGEMENT TABLE
222

| ISSUE ID (601) | HANDLING METHOD (602) | HASH VALUE (609) | MESSAGE GROUP (603) | MESSAGE CONTENT (604) | JOB ID (605) | PERSON IN CHARGE ID (606) | TIME (607) | BUG ID (608) |
|---|---|---|---|---|---|---|---|---|
| 1 | ... | | ... | ... | 1 | ... | ... | Bug1 |
| 2 | ... | | ... | ... | 2 | ... | ... | Bug2 |
| 3 | ... | | ... | ... | 3 | ... | ... | Bug3 |
| 4 | ... | | ... | ... | 4 | ... | ... | Bug4 |
| ... | ... | | ... | ... | ... | ... | ... | ... |

FIG.7

LOG-ISSUE MANAGEMENT TABLE
223

| EVENT ID (701) | ISSUE ID (702) |
|---|---|
| 1 | 4 |
| 2 | 5 |
| 3 | 3 |
| 4 | 2 |
| ... | ... |

FIG.8

DICTIONARY MANAGEMENT TABLE
224

| DICTIONARY ID 801 | TENANT ID 802 | CLASSIFICATION 803 | ITEM 804 | FEATURE 805 |
|---|---|---|---|---|
| 1 | 1 | ENVIRONMENTALLY DEPENDENT | HOST NAME | REFER FROM DNS |
| 2 | 1 | ENVIRONMENTALLY DEPENDENT | IP ADDRESS | IPv4:xxx.xxx.xxx.xxx |
| 3 | 1 | ENVIRONMENTALLY DEPENDENT | TIME | yyyy-mm-dd hh:mm:ss |
| 4 | 1 | ENVIRONMENTALLY DEPENDENT | SESSION ID | UUID FORMAT |
| 5 | 1 | SPECIFIC | MESSAGE IMPORTANCE LEVEL | INFO, WARNING, ERROR, CRITICAL,... |
| 6 | 1 | SPECIFIC | MESSAGE ID | Prefix: H001 Code index: -I, -W, -E, -C... |
| ... | ... | ... | ... | ... |

FIG.9

QUERY MANAGEMENT TABLE
225

| QUERY ID | TENANT ID | PROCESSING MODE | FUZZY SEARCH |
|---|---|---|---|
| 1 | 9 | REAL TIME | DONE |
| 2 | 7 | BATCH | NOT DONE |
| ... | ... | ... | ... |

HANDLING METHOD FOR FAILURE xxx THAT
OCCURRED IS AS FOLLOWS.

HANDLING METHOD: yyyy

HANDLING METHOD FOR FAILURE xxx
THAT OCCURRED IS NOT FOUND.

PRESS BUTTON BELOW AND TRANSFER LOG MESSAGE
GROUP ASSOCIATED WITH QUERY TO FOLLOWING SYSTEM.

TRANSFER

INQUIRY RESPONSE SYSTEM AND INQUIRY RESPONSE METHOD

TECHNICAL FIELD

The present invention generally relates to a response to an inquiry and typically relates to a response to an inquiry about a failure.

BACKGROUND ART

For example, Patent Document 1 discloses a technique for analyzing logs of a plurality of applications and detecting an abnormal event.

PRIOR ART DOCUMENT

Patent Document

Patent Document 1: JP-2016-24786-A

SUMMARY OF THE INVENTION

Problem to be Solved by the Invention

Meanwhile, a development team normally changes a configuration of a service system (for example, rewrites source code) in a development phase of the service system, builds the configuration-changed service system, and tests running of the built service system. It is noted that the "team" may be a single member or a plurality of members. In other words, whether development is development by a single member or joint development by a plurality of members, a subject of the development is the "team" for the sake of convenience. In addition, the "service system" is a general term of an object to be developed. The service system may be typically software (a computer program), and an example of the software (computer program) may be an application program (for example, application program that provides Web services) or middleware.

In the development phase, a log message is output and accumulated at least in a case of occurrence of a failure. Typically, cases in which log messages are output in the development phase are the following three types.

(1) A normal case (a process was performed on a correct value).

(2) A normal case (a normal process was performed such that an abnormality notification is issued with respect to an abnormal value).

(3) An abnormal case (a process resulted in abnormal termination by an unexpected value).

On the other hand, a log message is also output at least in a case of occurrence of a failure in an operations phase of the service system (for example, while a user (end user) is using the service system).

Using the technique disclosed in Patent Document 1 makes it possible to expect that an operation team (for example, an operator or a user) detects a failure by analyzing the log message.

However, a handling method for the failure is normally non-understandable from the log message.

There is known a methodology called DevOps, that is, a methodology of development and operations aiming at working together in collaboration between a development team (for example, a developer) and an operations team (for example, operations personnel). According to this approach, utilization of the log message, which was output in the operations phase, in the development phase is conceivable. However, the handling method for the failure that occurred in the operations phase is non-understandable.

A problem of this type possibly arises not only in an environment in which a plurality of teams of different kinds such as the development team and the operations team are present but also in an environment in which a plurality of teams of the same kind are present (for example, an environment in which a plurality of development teams develop one service system).

Means for Solving the Problem

A management system constructs management information indicating that log chunks and issue chunks extracted from a first system managing log information and issue information output by a process related to a first team for a program to be developed are linked. The management system searches, from the management information, a log message group compatible with a designated log message group that is one or more log messages related to the issue by log pattern matching using the designated log message group in a case of receiving an inquiry with which the designated log message group is associated from a second system that is a system related to a second team for the service system. The management system displays, on the second system, a response containing a handling method represented by handling method information corresponding to the found log message group.

Effect of the Invention

It is possible to identify a response to an issue that occurred for a different team.

BRIEF DESCRIPTION OF THE DRAWINGS

FIG. 5 illustrates a configuration of a log management table.
FIG. 6 illustrates a configuration of an issue management table.
FIG. 7 illustrates a configuration of a log-issue management table.
FIG. 8 illustrates a configuration of a dictionary management table.
FIG. 9 illustrates a configuration of a query management table.

MODES FOR CARRYING OUT THE INVENTION

Figure 1:
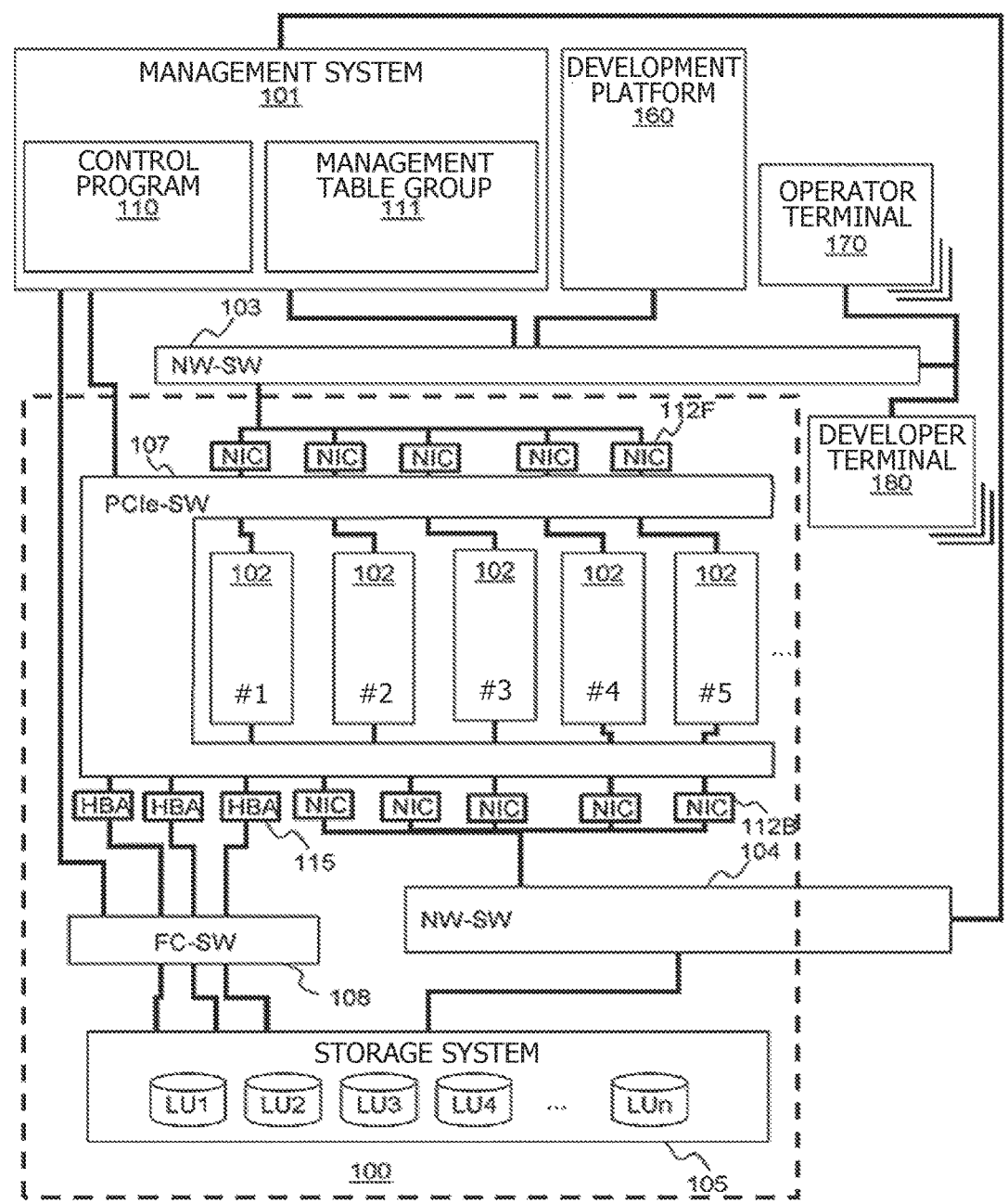
FIG. 1 illustrates a configuration of a computing system according to an embodiment.

An embodiment of the present invention applied to an environment in which a plurality of teams of different kinds are present will be described hereinafter with reference to the drawings. In the following embodiment, the plurality of teams of different kinds are a development team and an operations team. It is noted that the present invention is applicable not only to such an environment but also to an environment in which a plurality of teams of the same kind are present.

In the following description, an "interface section" includes one or more interfaces. The one or more interfaces may be one or more interface devices of the same kind (for example, one or more NICs (Network Interface Cards)) or may be two or more interface devices of different kinds (for example, an NIC and an HBA (Host Bus Adapter)).

Furthermore, in the following description, a "memory section" includes one or more memories. At least one memory may be either a volatile memory or a nonvolatile memory. The memory section may include not only the one or more memories but also one or more PDEVs. The "PDEV" means a physical memory device and may be typically a nonvolatile memory device (for example, an auxiliary memory device). For example, the PDEV may be an HDD (Hard Disk Drive) or an SSD (Solid State Drive).

Moreover, in the following description, a "processor section" includes one or more processors. At least one processor is typically a CPU (Central Processing Unit). The processor may include a hardware circuit that performs part of or entirety of processes.

Furthermore, in the following description, a process is often described with "program" used as a subject of the process; however, the subject of the process may be the processor section (or a computing machine or a computing system having the processor section) since a specified process is performed using at least one of the memory section and the interface section as appropriate by causing the processor section to execute the program. The program may be installed into the computing machine from a program source. The program source may be, for example, a program distribution server or a computing machine-readable memory media. Moreover, in the following description, two or more programs may be realized as one program or one program may be realized as two or more programs.

Furthermore, in the following description, information is often described using an expression such as "xxx table;" however, the information may be expressed in any data structure. In other words, to indicate that information does not depend on a data structure, "xxx table" can be rephrased as "xxx information." Further, in the following description, a configuration of each table is exemplarily depicted and one table may be divided into two or more tables and all of or part of the two or more tables may be one table.

Furthermore, in the following description, a "server-storage system" is a system that includes at least one of a server system and a storage system. The "server system" may be one or more physical servers (for example, a server cluster) or may include at least one virtual server (for example, a VM (Virtual Machine)). The "storage system" may be one or more physical storage devices or may include at least one virtual storage device (for example, an SDS (Software Defined Storage)).

Moreover, in the following description, a set of one or more computing machines displaying information for display may be referred to as "management system." In a case in which a management computing machine displays information on a display device of the management computing machine, the management computing machine may be the management system or a combination of the management computing machine and a display computing machine may be the management system. Furthermore, a plurality of computing machines may realize processes equivalent to those performed by the management computing machine for accelerated management processes and improved reliability; in this case, the plurality of computing machines (including a display computing machine in a case in which the display computing machine displays information) may be the management system. "Displaying information for display" by the management computing machine may mean displaying information for display on the display device owned by the management computing machine or may mean sending the information for display to a remote display computing machine from the management computing machine.

Moreover, in the following description, in a case of describing elements of the same kind without discriminating the elements, reference characters of the elements are often used, and in a case of describing the elements of the same kind while discriminating the elements, identification information assigned to the elements is often used. For example, in a case of describing servers without specifically discriminating the servers, notation such as server 102 is often used, and in a case of describing the servers while discriminating the individual servers, notation such as server #1 and server #2 is often used.

FIG. 1 illustrates a configuration of a computing system according to the embodiment.

The computing system includes a development platform 160, a developer terminal 180, an operator terminal 170, a management system 101, and a server-storage system 100. The server-storage system 100 includes a server system that includes a plurality of servers (physical servers) 102 and a storage system that provides a plurality of LUs (Logical Units). The LU may be referred to as "logical volume."

The development platform 160, which is one or more computing machines, is a platform for development of a service system.

The developer terminal 180 is an information processing terminal (for example, personal computer) of a developer. A plurality of developer terminals (or one developer terminal) 180 (developers) are present. The developers are members of at least one development team. The development team is a team that develops the service system utilizing the development platform 160.

The operator terminal 170 is an information processing terminal of an operator. A plurality of operator terminals (or one operator terminal) 170 (operators) are present. The operators are members of at least one operations team. The operations team is a team that operates the service system. The operators may be each, for example, an administrator of the service system or a user of the service system.

The management system 101, which is one or more computing machines, is an example of an inquiry response system. The management system 101 is connected to management interfaces 114 of an NW-SW (an example of a management network) 103 and an NW-SW (an example of a business network) 104. The management system 101 may set a VLAN (Virtual LAN) to each of the NW-SWs 103 and 104. The "NW-SW" is an abbreviation of a network switch. The NW-SW 103 is a network for the management system 101 to manage operations such as distribution and power supply control of an OS (Operating System) and applications running on the plurality of servers 102. The NW-SW 104 is a network used by the applications executed on the servers 102. It is noted that the NW-SW 104 is connected to a WAN (Wide Area Network) or the like to communicate with client computing machines of the server system.

The management system 101 is also connected to an FC-SW (fiber channel-switch) 108. The FC-SW 511 is an example of an I/O (Input/Output) network. The management system 101 is connected to the storage system 105 via the FC-SW 108.

The management system 101 manages the server-storage system 100. The management system 101 executes a control program 110 and manages a management table group 111.

In the server-storage system 100, each server 102 can execute a VM (virtual machine) as described later. The plurality of servers 102 are connected to the NW-SW 103 via a PCIe (PCI-Express)-SW 107 and a plurality of NICs (Network Interface Card) 112F, connected to the NW-SW 104 via the PCIe (PCI-Express)-SW 107 and a plurality of NICs 112F, and connected to the FC-SW 108 via the PCIe (PCI-Express)-SW 107 and a plurality of HBAs (Host Bus Adapters). The NICs and HBAs are each an example of an I/O device.

In the computing system, the management network, the business network, and the I/O network may be integrated.

Figure 2:
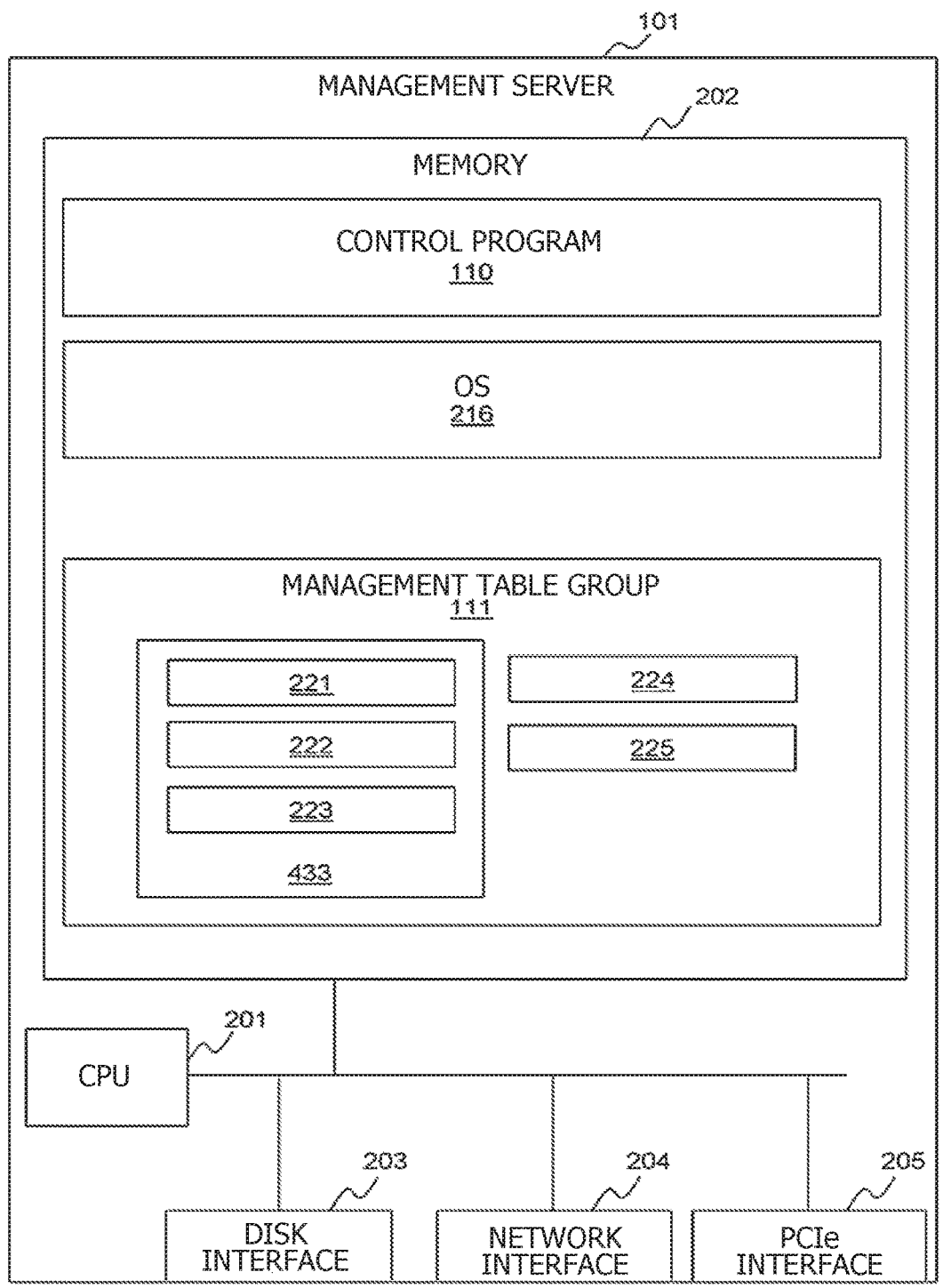
FIG. 2 illustrates a configuration of a management system.

FIG. 2 illustrates a configuration of the management system 101.

The management system 101 has an interface section, a memory section, and a processor section connected to the interface section and the memory section. Examples of the interface section include a disk interface 203 for access to the storage sub system 105, a network interface 204 for communication via the NW-SWs 103 and 104, and a PCIe interface 205 for communication via the PCIe-SW 107. The processor section is, for example, a CPU 201. The memory section is, for example, a memory 202. The memory 202 stores the control program 110, an OS 216, and the management table group 111. The CPU 201 executes the control program 110 and the OS 216. At least part of the management table group 111 may be stored in a memory device that is other than the memory 202 and that is not depicted, or in the storage system 105.

The management table group 111 is one or more tables. The management table group 111 includes a log management table 221, an issue management table 222, a log-issue management table 223, a dictionary management table 224, and a query management table 225. The log management table 221, the issue management table 222, and the log-issue management table 223 configure a "know-how DB" referred to as in the present embodiment. The "DB" is an abbreviation of a database. Information registered in the management table group 111 may be information (crude information) collected by the management program 110, information obtained by transforming the information, or information input by a system administrator from a console, which is not depicted, in the management system 101.

Figure 3:
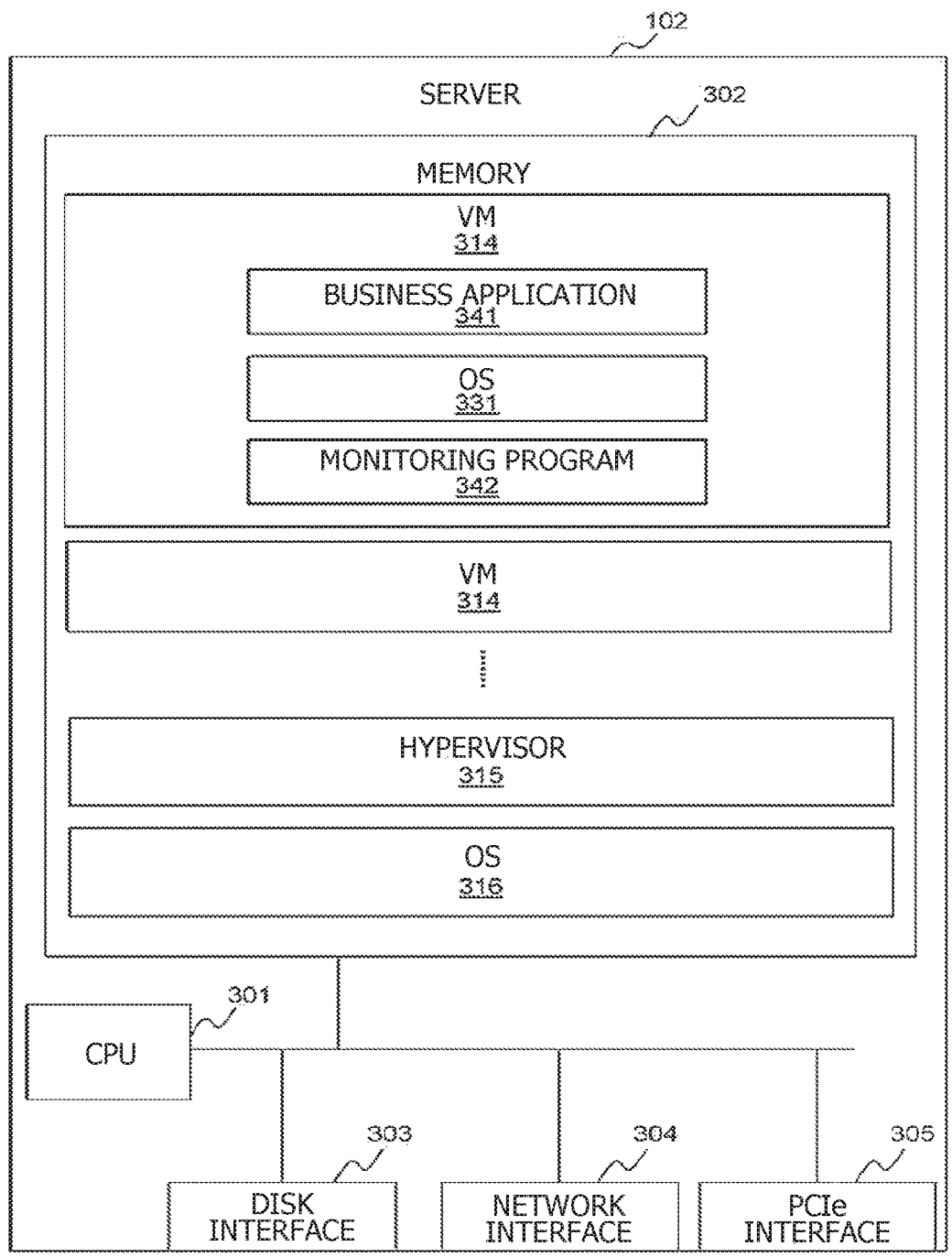
FIG. 3 illustrates a configuration of a server.

FIG. 3 illustrates a configuration of the server 102.

The server 102 has a disk interface 303, a network interface 304, a PCIe interface 305, a memory 302, and a CPU 301 connected to the disk interface 303, the network interface 304, the PCIe interface 305, and the memory 302. The interfaces 303 to 305 have same functions to those of the interfaces 203 to 205, respectively. The memory 302 executes an OS 316 and a hypervisor 315. The hypervisor 315 exercises control over creation, activation, termination, and deletion of a VM 314. The VM 314 executes a business application (program) 341, an OS (for example, a guest OS) 331, and a monitoring program 342. The monitoring program 342 monitors statuses of constituent elements such as the business application 341 and the OS 331, and outputs log messages that represent the statuses.

For example, the server-storage system 100 may be partitioned into a plurality of sub systems by LPAR (Logical Partitioning). The plurality of sub systems may include a sub system as a development system and a sub system as an actual system.

The development business application 341 that is the business application deployed from the development platform 160 may be built in the development VM (VM disposed in the development system) 314 as a service system to be developed. In a test, control is exercised over build, activation, termination, and the like of the development business application 341. The monitoring program 342 within the development VM 314 sends a log message related to a running status of the development business application 341 to the development platform 160. The log messages from the development system are accumulated in the development platform 160.

The actual VM (VM disposed in the actual system) 314 may execute the operations business application 341 that is the business application as a service system to be operated. The monitoring program 342 within the operations VM 314 may send a log message related to a running status of the operations business application 341 to the operator terminal 170 (or user terminal (not depicted) that is the information processing terminal of a user).

Figure 4:
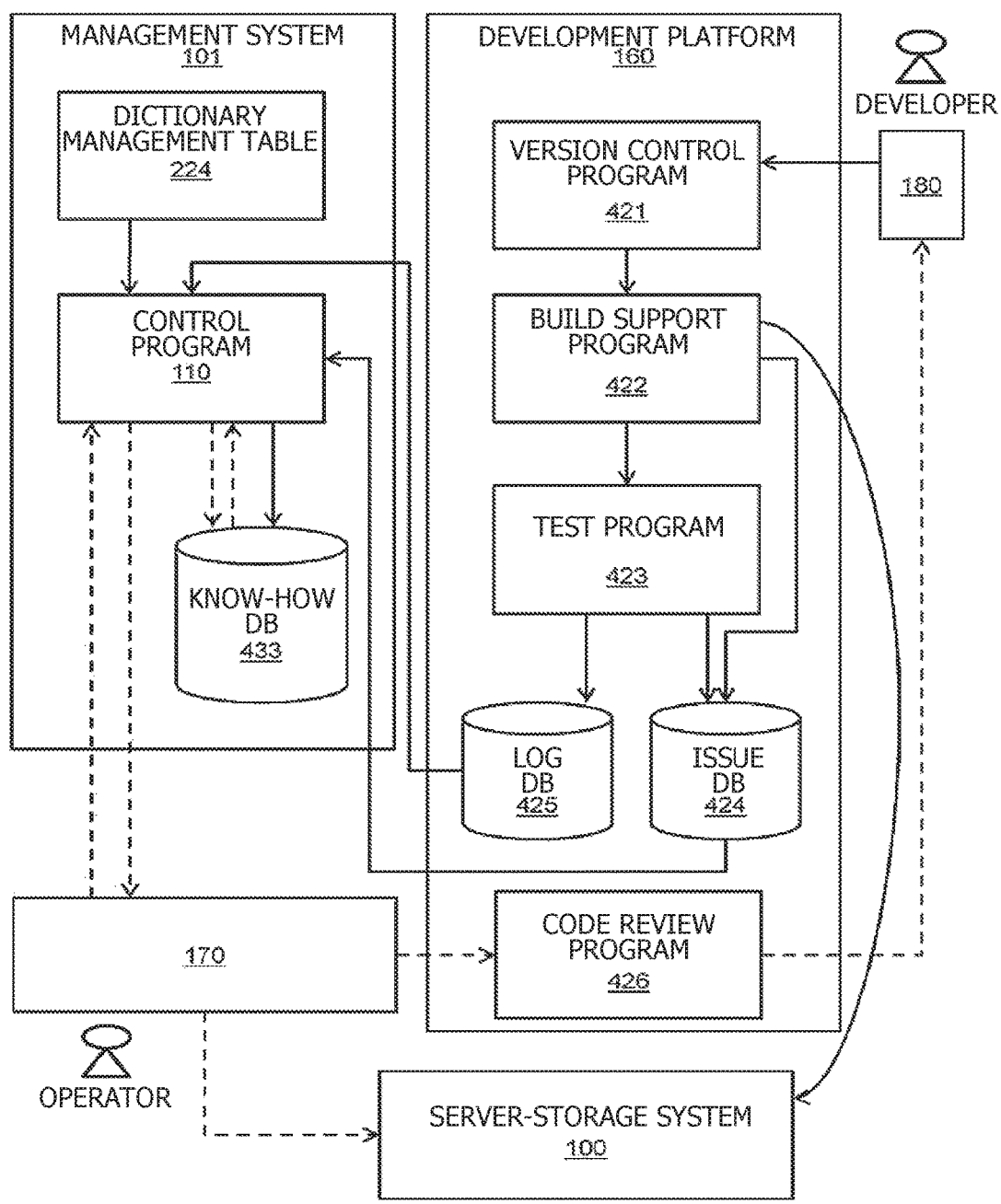
FIG. 4 illustrates an outline of the present embodiment.

FIG. 4 illustrates an outline of the present embodiment. In FIG. 4, solid line arrows signify processes in a development phase and broken line arrows signify processes in an operations phase.

In the present embodiment, a phase is roughly divided into the development phase and the operations phase, a result of the development phase can be utilized in the operations phase, and a result of the operations phase can be utilized in a future development phase (for example, development of patches).

<Development Phase>

In the development platform 160, a processor section, which is not depicted, in the development platform 160 executes, for example, a version control program 421, a build support program 422, a test program 423, and a code review program 426. Furthermore, the development platform 160 manages a log DB 425 and an issue DB 424. The log DB 425 and the issue DB 424 may be provided in the development platform 160 or may be provided in an external storage to the development platform 160.

The version control program 421 controls a version of the service system (for example, the business application 341) to be developed. As an example of the version control program 421, git, that is, a distributed version control system that controls a change history of a program source and the like can be adopted. The version control program 421 controls, for example, who committed new code when. A code change to the version control program 421 is executed using, for example, a request such as push, supported by the program 421. In the development phase, the following processes, for example, are executed. In the processes, a log message is stored in the log DB 425 and an issue message is stored in the issue DB as appropriate.

(S1) Push a code change to the version control program 421.

(S2) Build a program (service system) compliant with the pushed code.

(S3) Test the built program (service system).

(S4) Issue a merge request (pull request) if a result of (S3) is OK. A merge is executed, for example, manually.

(S5) Push the merged code. Execute (S2) and (S3) for the merged code. End if a result of (S3) is OK.

The build support program 422 builds the program (service system) compliant with the updated program code by the version control program 421, deploys the built program into the server-storage system 100, requests the test program 423 to test the deployed program. As an example of the build support program 422, Jenkins can be adopted.

The test program 423 tests the deployed program (business application 341).

The code review program 426 displays the code of the program to be developed (for example, code before and after update (including a difference between the code before update and the code after update)) on the developer terminal 180. The code to be displayed may be program code managed by the version control program 421. An example of the code review program 426, gerrit can be adopted.

At least one of the version control program 421, the build support program 422, and the test program 423 outputs a log message at least in a case of occurrence of a failure, and stores the output log message in the log DB 425. In the present embodiment, the test program 423 outputs the log message and stores the log message in the log DB 423 whether or not the failure occurred.

At least one of the version control program 421, the build support program 422, and the test program 423 outputs an issue message in a case of occurrence of an issue of some sort, and stores the output issue message in the issue DB 424. The "issue" may mean a failure or may mean an abnormality less serious than the failure. In the present embodiment, the build support program 422 and the test program 423 store the issue message in the issue DB 423. The issue message contains a log message. In other words, in a case of occurrence of the issue such as a failure, not only the log message but also the issue message containing a log message is output.

The log message is managed in predetermined units such as event units. In the present embodiment, the log message is managed per event. One or more log messages associated with one event can be referred to as "a log message group." One chunk containing the log message group can be referred to as "log chunk." While the "event" corresponds to a test in the present embodiment, the "event" may be a job such as build or deploy. The "job" may be an execution unit of a program such as the build support program 422.

The issue message is managed per issue. The issue message is output when a fail is determined in a test, a job, or the like. The issue message contains one or more log messages. One chunk containing the issue messages can be referred to as "issue chunk." The issue chunk contains information that represents a handling method for the issue.

The control program 110 reads log messages from the log DB 425 in, for example, log chunk units. Furthermore, the control program 110 reads issue messages from the issue DB 424 in, for example, issue chunk units. The control program 110 compares the log message groups within one or more log chunks with the log message groups within one or more issue chunks, that is, performs log pattern matching. The control program 110 links the log chunk to the compatible issue chunk. For example, a word (for example, unique word) that acts as a search key is extracted by grep or the like from each of the log message groups within the one or more log chunks and the log message groups within the one or more issue chunks, and the control program 110 links the log chunk to the issue chunk in a case in which the extracted words match each other. Linkage of the log chunk to the issue chunk is stored in the know-how DB 433. It is noted that the linkage of the log chunk to the issue chunk (update of the know-how DB 433) may be performed on a regular basis or may be performed when code is pushed (a pull request generated due to the push is issued).

In the present embodiment, the log chunk is present per event and the issue chunk is present per issue. One or more issues are associated with one event in some cases, while one issue triggers a plurality of events in other cases. Owing to this, event:issue may be 1:1, N:1, 1:M, or N:M (where N and M are integers equal to or greater than 2).

Furthermore, in the present embodiment, the control program 110 executes a mask process for masking message items corresponding to noise among the log messages contained in the read log chunk and issue chunk. The control program 110 performs the log pattern matching using the log message groups after the mask process. It is thereby possible to improve accuracy of the log pattern matching, that is, improve accuracy of the linkage of the log chunk to the issue chunk. In the present embodiment, the "noise" is a message item that is defined as a cause for reducing the accuracy of the log pattern matching, that is, a message item that is defined as being low in a degree of involvement in an objective of the log pattern matching. In the present embodiment, the message item corresponding to the noise is an environmentally-dependent message item. The "environmentally-dependent message item" is a message item that takes on a different value in a different environment even with the identical message item, and examples of the "environmentally-dependent message item" include a host name, an IP address, and time. The control program 110 identifies which of the items in the log message is the environmentally-dependent message item by referring to the dictionary management table 224. In the present embodiment, the log messages after the mask process are stored in any of the log management table 221 and the issue management table 222; alternatively, the log messages after the mask process may be stored only in the log management table 221. In that alternative, in a query process with which the log messages for which the mask process is necessary to perform are associated in the operations phase, log messages may be searched from the log management table 221 using the log messages (or a hash value thereof) obtained by performing the mask process for the log messages as a key. If a hit hash value is present, then an issue ID may be searched from the issue management table 222 using an issue ID corresponding to an event ID corresponding to the hash value as a key. On the other hand, in the query process with which the log messages for which the mask process is unnecessary to perform (for example, the log messages that contain only error code) is associated, log messages may be searched from not the log management table 221 but from the issue management table 222 using the log messages (or the hash value thereof) as a key.

<Operations Phase>

It is assumed that after start of operations of the program (business application 341) that was completed with development and was released, a failure of some sort occurred in the operations. In that case, the control program 110 receives a query with which a log message group for the failure that occurred is associated, from an external system such as the operator terminal 170. The external system may be an analysis system such as an RCA (Root Cause Analysis) system that analyzes a root cause of the failure as an alternative to or in addition to the operator terminal 170.

The control program 110 searches a log message group compatible with the log message group associated with the query from the know-how DB 433 using the log message group associated with the query as a key. The log message group used as the key is the log message group obtained by performing the mask process on the log message group (log message group associated with the query) by referring to the dictionary management table 224.

The control program 110 sends a query response according to a search result to the query source (external system such as the operator terminal 170).

In a case of finding the compatible log message group (perfectly matching log message group or log message group having a similarity equal to or higher than a predetermined value), the query response contains information such as the handling method associated with the compatible log message group. The operator can be informed of the handling method or the like for the failure that occurred on the basis of the handling method or the like.

In a case in which the compatible log message group was not found, the external system such as the operator terminal 170 (or the control program 110) transfers the log message group associated with the query to a predetermined system. The "predetermined system" may be the development platform 160 or may be an intermediate system that transfers information to the development platform 160. In any case, in the case in which the compatible log message group was not found, the log message group associated with the query is input to the development platform 160. In this case, the code review program 426 displays the input log message group and information signifying that the log message group was not output in the development phase on any of the developer terminals 180. Viewing the displayed log message group and the displayed information enables the developer to take measures including development of a patch of the developed program (business application 341).

A configuration of each management table will now be described.

FIG. 5 illustrates a configuration of the log management table 221.

The log management table 221 holds information such as a configuration, a log message sequence, and the like of each log message group. Specifically, the log management table 221 has an entry per event. Information such as an event ID 501, a tenant ID 502, a hash value 503, a message group 504, and a message content 505 is held in each entry.

The event ID 501 is an ID (identification information) of an event. The event ID may be an ID assigned by the test program 423 within the development platform 600 or may be an ID assigned by the control program 110. The tenant ID 502 is an ID of a tenant (a team or a member in the team). The hash value 503 is a hash value of the log message group on which the mask process was performed. The message group 504 is one or more message IDs corresponding to the one or more log messages, respectively, that configure the log message group. In the message group 504, a sequence of the message IDs is the same as a sequence of the log messages in the log message group. The message IDs may be each an ID assigned by a source of the log message or may be an ID assigned by the control program 110 in a normalization process on the log message. The message content 505 contains the one or more log messages (raw data or log messages obtained by performing a predetermined normalization process such as format conversion on the raw data) configuring the log message group, and one or more mask log messages corresponding to the one or more log messages, respectively. The "mask log message" is a log message on which the mask process was performed.

FIG. 6 illustrates a configuration of the issue management table 222.

The issue management table 222 holds information representing each issue that occurred and a handling method (solution). Specifically, the issue management table 222 has an entry per issue. Information such as an issue ID 601, a handling method 602, a hash value 609, a message group 603, a message content 604, a job ID 605, a person in charge ID 606, time 607, and a bug ID 608 are held in each entry.

The issue ID 601 is an ID of an issue. The issue ID may be an ID assigned by the build support program 42 or the test program 423 within the development platform 600 or may be an ID assigned by the control program 110. The handling method 602 represents a handling method that is a procedure taken to solve the issue. The hash value 609 is a hash value of the log message group on which the mask process was performed. The message group 603 is one or more message IDs corresponding to the one or more log messages, respectively generated in response to the issue. The message content 604 contains one or more log messages (raw data or log messages obtained by performing a normalization process on the raw data) in the message group 603 and one or more mask log messages corresponding to the one or more log messages, respectively. The job ID 605 is an ID of a job that is a cause for occurrence of the issue (for example, the execution unit of the build support program 42 or the test program 423). The person in charge ID 606 is an ID of a person in charge of development who causes the job to be executed. The time 607 represents time of occurrence of the issue. The bug ID 608 is an ID of a bug that occurred as the issue. A content (entity) of the bug may be associated with the bug ID.

The log messages within the message content 604 do not possibly perfectly match the log messages within the message content 505 in the log management table 221 even if the log messages are identical. Specifically, this is because, for example, the log messages stored in the issue DB 424 are information input either manually or in a simplified automatic fashion (for example, by mechanically clipping the information by time or the like) at an opportunity of occurrence of the issue. For example, the log messages stored in the log DB 425 may contain relatively less noise (for example, noise-free) while the log messages stored in the issue DB 424 may contain relatively more noise. Owing to this, simply performing the log pattern matching by comparing the log message group within the log DB 425 with the log message group within the issue DB 424 often results in incompatibility even if the log message groups are supposed to be compatible with each other. In the present embodiment, the mask process described above is performed on the log message group and then the log pattern matching is performed; thus, it is possible to lower the probability of incompatibility even if the log message groups are supposed to be compatible with each other.

FIG. 7 illustrates a configuration of the log-issue management table 223.

The log-issue management table 223 holds information representing linkage of a log chunk to an issue chunk, that is, linkage of an event to an issue. Specifically, the log-issue management table 223 has an entry per event. Information such as an event ID 701 and an issue ID 702 is held in each entry. The event ID 701 is an ID of an event. The issue ID 702 is an ID of an issue. In one entry, one event ID and one issue ID, one event ID and M issue IDs, N event IDs and one issue ID, or N event IDs and M issue IDs are registered. In other words, event ID: issue ID may be 1:1, N:1, 1:M, or N:M (where N and M are integers equal to or greater than 2).

FIG. 8 illustrates a configuration of the dictionary management table 224.

The dictionary management table 224 holds information about formats of log messages and information about environmentally-dependent message items (for example, formatted reports). A non-environmentally dependent message item that is not an environmentally-dependent message item is a "specific" message item in the present embodiment. As for the specific message item, in a case in which the format is set, a feature point can be calculated using a value of the message item. Extracting the message ID, in particular, can facilitate creating the message groups 504 and 603.

The dictionary management table 224 has an entry per message item. Information such as a dictionary ID 801, a tenant ID 802, a classification 803, an item 804, and a feature 805 is held in each entry.

The dictionary ID 801 is an ID of a dictionary (for example, an entry serial number). The tenant ID is an ID of a tenant. For example, if the item 804 is the same but the tenant is not the same, the feature 805 (for example, a format and a feature (way of acquiring information)) may vary. The classification 803 represents a message item type such as "environmentally-dependent" or "specific." The item 804 represents an item name of the message item. The feature 805 represents the format and the feature of the message item 805.

FIG. 9 illustrates a configuration of the query management table 225.

The query management table 225 holds information about each query. Specifically, the query management table 225 has an entry per query. Information such as a query ID 901, a tenant ID 902, a processing mode 903, and a fuzzy search 904 are held in each entry.

The query ID 901 is an ID of the query. The tenant ID 902 is an ID of a tenant that issued the query (for example, an operator or an operations team to which the operator belongs). The processing mode 903 represents a processing mode (for example, "real time" or "batch") of the query (one or more log messages associated with the query). The processing mode may be designated manually by the operator or the like. The fuzzy search 904 represents whether a fuzzy search is done.

According to the "real time" processing mode, a query is searched using the log message group associated with the query and configured with the one or more log messages as a key in real time in response to the query, and a query response according to a search result is sent back. On the other hand, according to the "batch" processing mode, a query is searched using the log message group associated with the query and configured with the one or more log messages as a key by batch in response to the query, and a query response according to a search result is sent back. In a case in which a volume of the log message group associated with the query is relatively small, the "real time" processing mode is preferably adopted. In a case in which the volume of the log message group associated with the query is relatively large or the log message group is to be processed in parallel, the "batch" processing mode is preferably adopted.

As for fuzzy search "not done," the compatible log message group is found in a case of obtaining perfect matching. As for fuzzy search "done," the compatible log message group is found in a case of obtaining partially matching. It is noted that search methods include a search method for messages contained in the message group 504 one by one on condition of perfect matching, and a fuzzy search method. In a case of the fuzzy search, not only a method of sending back a result on condition of partially matching in response to an input for which replacement of the message sequence or message loss occurred but also a method of sending back the search result upon digitizing a degree of matching may be adopted.

Processes performed in the present embodiment will now be described while separately referring to the development phase and the operations phase.

<Development Phase>

Figure 10:
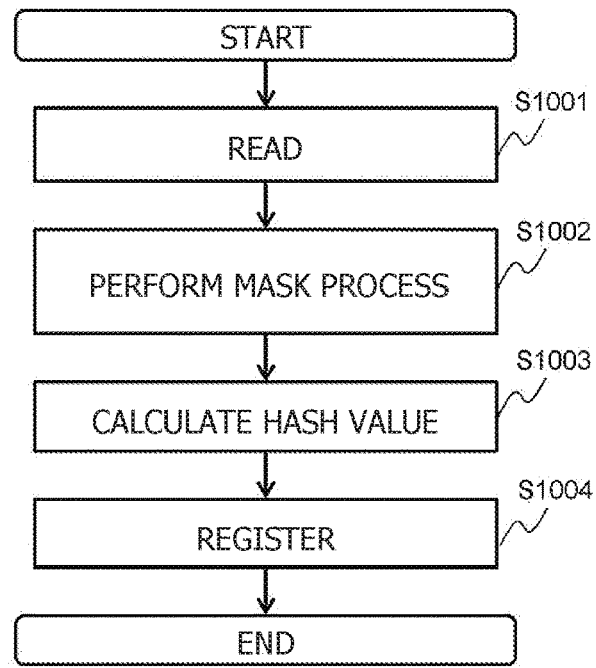
FIG. 10 illustrates a flow of a log storage process.

FIG. 10 illustrates a flow of a log storage process.

The log storage process is a process for storing the hash value of each log message group in the know-how DB. A read source of the log message group will now be described while separately referring to the log DB 425 and to the issue DB 424. The log storage process may be performed whenever log messages in event units or issue units are stored in either the log DB 425 or the issue DB 424 or may be performed at certain time intervals.

<<Read Source of Log Message Group is Log DB 425>>

The control program 110 reads the log messages in log chunk units (event units) from the log DB 425 and stores the log messages in the memory 302 (S1001). The control program 110 performs the mask process on the read log messages while referring to the dictionary management table 224 (S1002). Specifically, the control program 110 masks the item identified as the environmentally-dependent message item among the log messages on the basis of the dictionary management table 224. The control program 110 calculates a hash value of a mask log message group associated with an event. The control program 110 registers the following information in the log management table 221 (S1004).

The event ID 501: the ID of the event
The tenant ID 502: the ID of the tenant
The hash value 503: the calculated hash value
The message group 504: the one or more message IDs corresponding to the one or more log messages, respectively, that configure the log message group associated with the event
The message content 505: a content of the log message group associated with the event and a content of the mask log message group associated with the event <<Read Source of Log Message Group is Issue DB 424>>

The control program 110 reads the log messages in issue chunk units (issue units) from the issue DB 424 and stores the log messages in the memory 302 (S1001). The control program 110 performs the mask process on the read log messages while referring to the dictionary management table 224 (S1002). The control program 110 calculates a hash value of a mask log message group associated with an event. The control program 110 registers the following information in the issue management table 222 (S1004).

The issue ID 601: the ID of the issue
The handling method 602: the handling method (for example, information contained in the issue chunk and manually input by the developer or the like)
The hash value 609: the calculated hash value
The message group 603: the one or more message IDs corresponding to the one or more log messages, respectively, that configure the log message group associated with the issue
The message content 604: a content of the log message group associated with the issue and a content of the mask log message group associated with the issue
The job ID 605: the ID of the job associated with the issue
The person in charge ID 606: the ID of the person in charge of development who causes the job to be executed
The time 607: the time of occurrence of the issue (time contained in the issue chunk)

The bug ID 608: the ID of the bug associated with the issue

Figure 11:
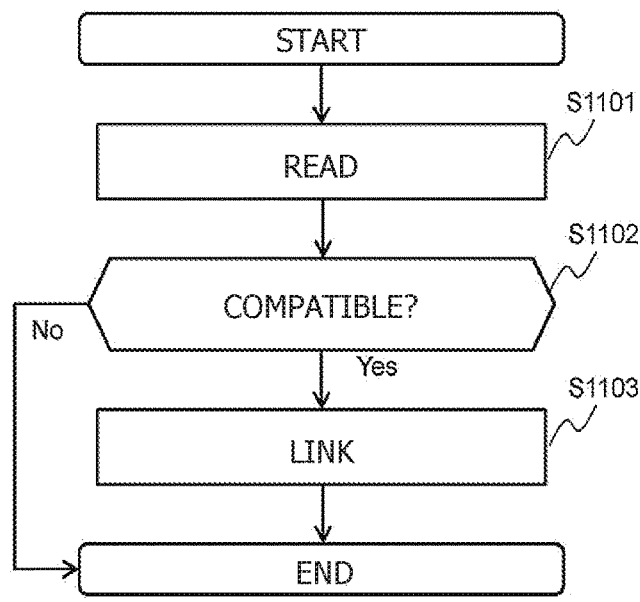
FIG. 11 illustrates a flow of a linkage process.

FIG. 11 illustrates a flow of a linkage process.

The linking process is a process for linking an event to an issue. The linkage process may be performed whenever information is added to the log management table 221 or the issue management table 222 or may be performed at certain time intervals.

The control program 110 reads the hash value 609 and the message group 603 corresponding to an intended issue ID (S1101). The "intended issue ID" is the issue ID of the issue satisfying a predetermined condition. The "issue satisfying a predetermined condition" means an issue for which the time 607 belongs to a predetermined time zone (for example, from a current time point to a past time point by certain time) and which is not linked to an event.

The control program 110 searches the hash value 503 that matches the read hash value 609 or the message group 504 that perfectly matches the read message group 603 (or the message group 504 that partially matches the read message group 603 with the similarity to the read message group 603 being equal to or higher than the predetermined value) (S1102).

In a case of having found the hash value 503 or the message group 504, the control program 110 registers the event ID corresponding to the found hash value 503 or message group 504 and the intended issue ID in the log-issue management table 223.

In the linkage process, one or a plurality of events may fall in a search range of S1102 for one issue ID, or one or a plurality of events may fall in the search range of S1102 for a plurality of issue IDs. As such, correspondence between the event ID and the issue ID registered in the log-issue management table 223 is 1:1, N:1, 1:M, or N:M.

Furthermore, the search range of S1102 for the event may be only the log message group that contains log messages issued at time belonging to the predetermined time zone relative to the time 607 corresponding to the intended issue ID. In this case, time columns are provided in the log management table 221 and entries may be arranged in an ascending order or a descending order of the time.

<Operations Phase>

Figure 12:
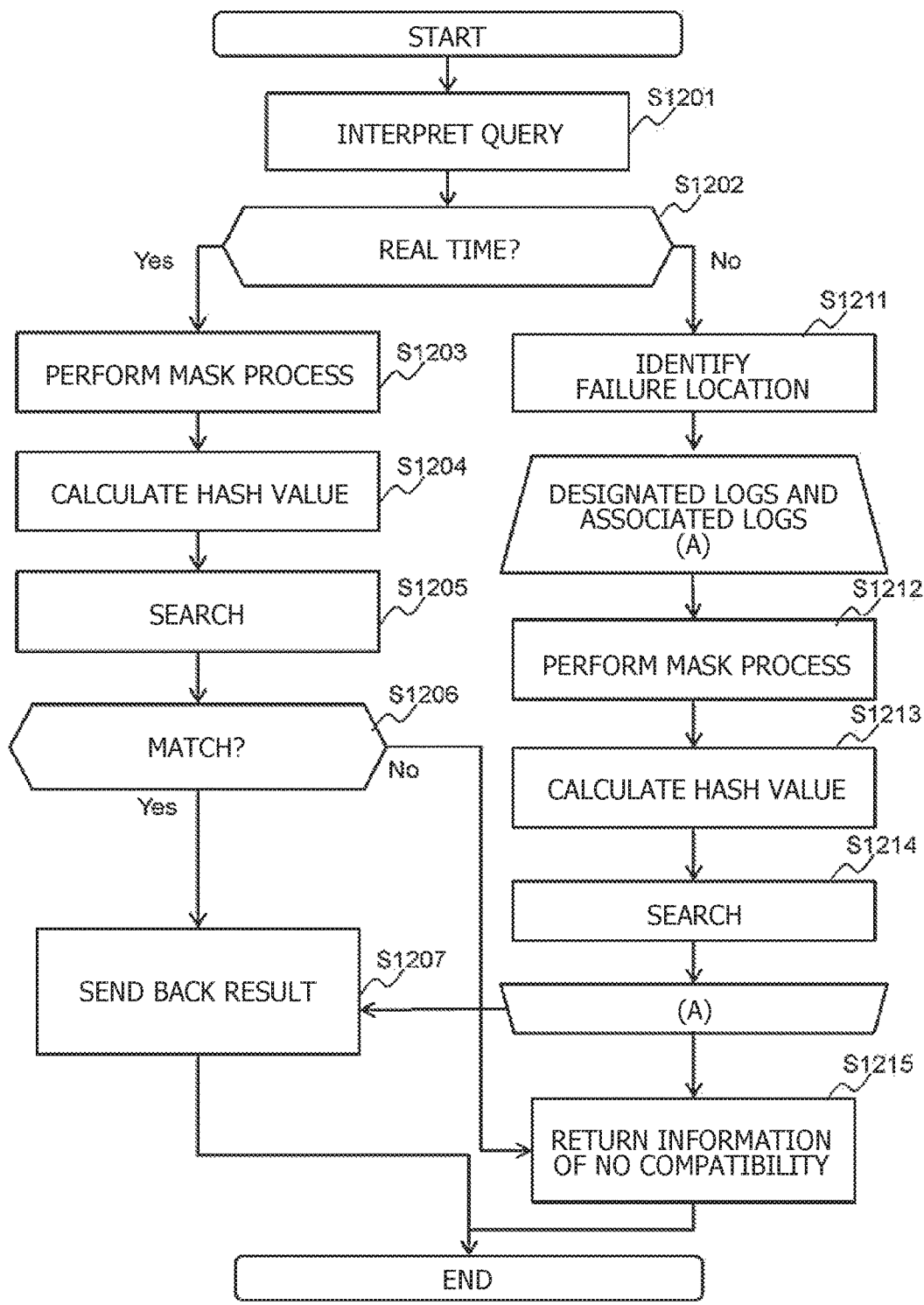
FIG. 12 illustrates a flow of a query process.

FIG. 12 illustrates a flow of a query process. The query process is started in a case of receiving a query with which the log message group (for example, the log message group corresponding to a failure that occurred) is associated.

The control program 110 interprets the received query and registers an interpretation result in the query management table 225 (S1201). In the query management table 225, the query ID 901, the tenant ID 902, the processing mode 903, and the fuzzy search 904 are registered. The registered information 902 to 904 is information associated with the received query. Furthermore, the message group (one or more message IDs within the log message group associated with the received query) is identified by the interpretation in S1201.

The control program 110 determines whether the processing mode corresponding to the received query is "real time" or "batch" (S1202).

In a case in which the processing mode corresponding to the received query is "real time," the control program 110 performs the mask process on each log message within the log message group associated with the received query (S1203). The control program 110 calculates the hash value of the log message group after the mask process (S1204). The control program 110 searches (x1) the hash value 503 that matches the calculated hash value, (x2) one or more message groups 504 that perfectly match the message group (one or more message IDs) identified by the interpretation in S1201, and (x3) the message group 504 that partially match the message group (one or more message IDs) identified by the interpretation in S1201 (for example, the similarity of the message group 504 is equal to or higher than the predetermined value) (S1205). In a case of the fuzzy search is "not done," the control program 110 does not execute the search of (x3).

Figure 13:
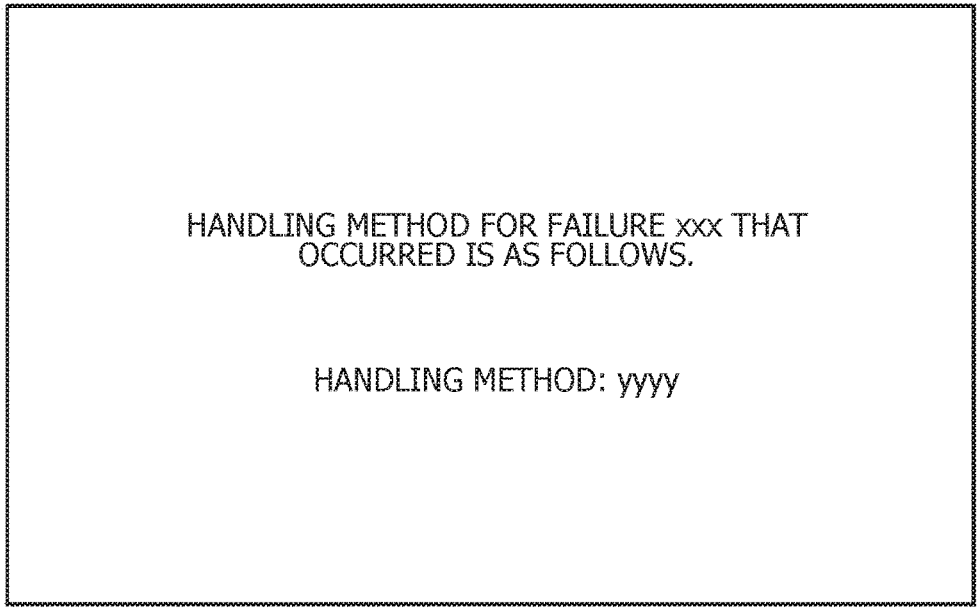
FIG. 13 illustrates an example of a result screen in a case in which matching was obtained.

In a case in which at least one of (x1) to (x3) was found (S1206: Yes), the control program 110 executes S1207. In other words, the control program 110 identifies the issue ID linked to the event ID corresponding to the found information from the log-issue management table 223. The control program 110 identifies at least the handling method 603 among the information 601 to 608 corresponding to the identified issue ID from the issue management table 222, and sends back the query response containing the identified handling method 603 and the like to the source of the query. The information contained in the query response is displayed on the source of the query (for example, the operator terminal 170). FIG. 13 illustrates an example of a display screen. The display screen enables the source of the query (for example, operator) to be informed of the handling method for the failure.

Figure 14:
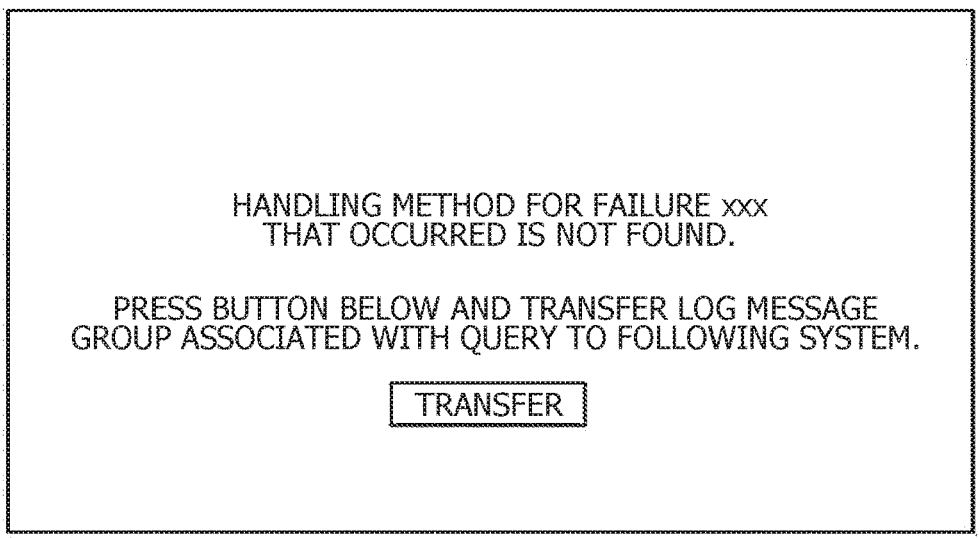
FIG. 14 illustrates an example of a result screen in a case in which matching was not obtained.

In a case in which none of (x1) to (x3) was found (S1206: No), the control program 110 sends back the query response containing information indicating that there is no compatible log message group to the source of the query (S1215). The information contained in the query response is displayed on the source of the query (for example, the operator terminal 170). FIG. 14 illustrates an example of a display screen. As illustrated in FIG. 4, the operator (or the control program 110 detecting that there is no compatible log message group) may transfer the log message group associated with the query to the predetermined system (for example, the code review program 426). The log message group is displayed to the developer through any of the developer terminals 180. The developer can take measures such as a patch on the basis of the log message group.

In a case in which the processing mode corresponding to the received query is "batch," the control program 110 identifies a failure location on the basis of the log message group associated with the received query (S1211). The control program 110 identifies a designated log message group that is the log message group associated with the received query and an associated log message group that is the log message group associated with the identified failure location, and executes S1212 to S1214 for each of the log message groups (loop (A)). The "associated log message group" can be identified by, for example, referring to an update history of a tree structure managed by the version control program 421. In other words, the "associated log message group" may be a log message group corresponding to either a higher node (for example, parent node) or a lower node (for example, child node) than a node corresponding to the failure log message group.

In loop (A), S1212 to S1214 for each of the log message groups are similar to S1203 to S1205, respectively.

After end of loop (A), in a case in which at least one of (x1) to (x3) was found for at least one log message group, the control program 110 executes S1207. After end of loop (A), in a case in which none of (x1) to (x3) was found for any of the log message groups, the control program 110 executes S1215.

According to the present embodiment, the know-how DB 433 in which the two kinds of log information (log information related to an event and log information related to an issue) generated in the development phase are linked to each other is constructed. This makes it possible to acquire the handling method as knowledge obtained in the development phase prior to the operations phase other than the development phase (operations team that is a team of the different kind from that of the development team) by referring to the know-how DB 433 using information about an issue such as a failure as a key even if the issue occurred in the operations phase. In other words, even for the issue that occurred for the first time in the operations phase, it is possible to notify the operator of the handling method if the issue is one that occurred in the development phase.

Furthermore, it is normally difficult for the operator to predict the handling method for the failure by simply referring to the log message group. According to the present embodiment, by contrast, issuing the query with which the log message group that occurred in the operations phase is associated makes it possible to perform the log pattern matching for the log message group and inform the operator of the handling method obtained in the development phase as a result of the matching. This can facilitate notifying the operator of the handling method on the basis of the log message group.

Moreover, definition of issues often differs between a plurality of teams of different kinds such as the development phase and the operations phase. In the development phase, for example, it is normal that an error is output when code K is input, while in the operations phase, it is abnormal (determined as an issue) that an error is output when the code K is input (in other words, input of the code K is an issue). In this way, despite the difference in the definition of the issues, a response to the query is sent back as the result of the matching for the log message group described above; thus, enhanced convenience can be ensured in the present embodiment.

In addition, the matching between the log message groups is log pattern matching using the mask log message groups. In other words, the noise that is the environmentally-dependent message item is masked, and the pattern matching is performed using the log message groups after masking. It is, therefore, possible to improve accuracy of matching.

Moreover, according to the present embodiment, it is possible to facilitate troubleshooting for, for example, an application in application development. In other words, the troubleshooting may be prepared as the handling method in the development phase.

Furthermore, according to the present embodiment, it is possible to facilitate troubleshooting during, for example, actual operations.

While one embodiment has been described so far, the description does not intend to limit a scope of the present invention only to the embodiment. The present invention can be implemented in various other forms. For example, at least one of the following respects can be achieved.

For example, it is possible to facilitate troubleshooting for a system in large-scale application development. In other words, in an environment in which a plurality of development teams as an example of a plurality of teams of the same kind develop an application, an issue and the handling method for the issue obtained in any of the development teams can be utilized by the other development team.

Moreover, a plurality of versions may be prepared for, for example, the know-how DB 433. Those versions may be linked to the version controlled by the version control program 421. The know-how DB in the version that is controlled by the version control program 421 and that is linked to the designated version may be a know-how DB to be referenced.

DESCRIPTION OF REFERENCE CHARACTERS

101: Management system

The invention claimed is:

1. An inquiry response system comprising:
an interface section connected to a first system that is a system managing log information and issue information output by a process related to a first team for a service system that is a program to be developed and to a second system that is a system related to a second team for the service system;
a processor section connected to the interface section; and
a memory coupled to the processor section storing instructions that when executed by the processor configure the processor to:
(A) construct management information that is information indicating that one or more log chunks and one or more issue chunks extracted from the first system are linked, wherein
the log chunks are information per event and each contain an event log message group that is one or more log messages associated with an event, and
the issue chunks are information per issue and each contain an issue log message group that is one or more log messages associated with an issue and handling method information that is information representing a handling method for the issue;
(B) search, from the management information, a log message group compatible with a designated log message group that is one or more log messages related to the issue by log pattern matching using the designated log message group in a case of receiving an inquiry with which the designated log message group is associated from the second system; and
(C) display, on the second system, a response containing the handling method represented by the handling method information corresponding to the found log message group.

2. The inquiry response system according to claim 1, wherein
the one or more log chunks and the one or more issue chunks that are linked in the management information are chunks for which compatibility is obtained as a result of the log pattern matching between the one or more event log message groups within the one or more log chunks and the one or more issue log message groups within the one or more issue chunks.

3. The inquiry response system according to claim 2, wherein
the log pattern matching related to linkage in (A) and the log pattern matching in (B) performed by the processor section are each log pattern matching between mask log message groups, and
the mask log message groups are each a log message group in which an environmentally-dependent message item out of the log messages is masked.

4. The inquiry response system according to claim 1, wherein
in a case in which the log message group was not found as a result of a search in (B), the processor section displays, on the second system, a response presenting transfer of the designated log message group to the first team.

5. The inquiry response system according to claim 1, wherein
the first team and the second team are teams of different kinds.

6. The inquiry response system according to claim 5, wherein
the first team is a development team, and
the second team is an operations team.

7. The inquiry response system according to claim 1, wherein
the first team and the second team are teams of a same kind.

8. The inquiry response system according to claim 7, wherein
the first team and the second team are development teams.

9. An inquiry response method, executed by a processor, comprising the steps of:
(A) constructing management information that is information indicating that one or more log chunks and one or more issue chunks extracted from a first system that is a system managing log information and issue information output by a process related to a first team for a service system that is a program to be developed are linked, wherein
the log chunks are information per event and each contain an event log message group that is one or more log messages associated with an event, and
the issue chunks are information per issue and each contain an issue log message group that is one or more log messages associated with an issue and handling method information that is information representing a handling method for the issue;
(B) searching, from the management information, a log message group compatible with a designated log message group that is one or more log messages related to the issue by log pattern matching using the designated log message group in a case of receiving an inquiry with which the designated log message group is associated from the second system; and
(C) displaying, on the second system, a response containing the handling method represented by the handling method information corresponding to the found log message group.

10. A non-transitory computer readable storage medium storing a computer program,
the computer program causing a computer to execute:
(A) constructing management information that is information indicating that one or more log chunks and one or more issue chunks extracted from a first system that is a system managing log information and issue information output by a process related to a first team for a service system that is a program to be developed are linked, wherein
the log chunks are information per event and each contain an event log message group that is one or more log messages associated with an event, and
the issue chunks are information per issue and each contain an issue log message group that is one or more log messages associated with an issue and handling method information that is information representing a handling method for the issue;
(B) searching, from the management information, a log message group compatible with a designated log message group that is one or more log messages related to the issue by log pattern matching using the designated log message group in a case of receiving an inquiry with which the designated log message group is associated from the second system; and
(C) displaying, on the second system, a response containing the handling method represented by the handling method information corresponding to the found log message group.

* * * * *